United States Patent
Bent et al.

(10) Patent No.: US 6,463,442 B1
(45) Date of Patent: Oct. 8, 2002

(54) CONTAINER INDEPENDENT DATA BINDING SYSTEM

(75) Inventors: Samuel W. Bent, Bellevue; Erik B. Christensen, Seattle; Richard A. Rollman, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,396

(22) Filed: Jun. 30, 1998

(51) Int. Cl.[7] ............................................. G06F 17/30
(52) U.S. Cl. ................................................. 707/103 R
(58) Field of Search ......................... 707/103, 1, 100; 709/331, 310

(56) References Cited

U.S. PATENT DOCUMENTS

| | | | | |
|---|---|---|---|---|
| 5,509,123 A | * | 4/1996 | Dobbins et al. ............ 709/243 |
| 5,706,505 A | * | 1/1998 | Fraley et al. ............... 707/103 |
| 5,911,068 A | * | 6/1999 | Zimmerman et al. ....... 709/328 |
| 6,006,230 A | * | 12/1999 | Ludwig et al. ............... 707/10 |
| 6,067,578 A | * | 5/2000 | Zimmerman et al. ....... 709/315 |
| 6,158,044 A | * | 12/2000 | Tibbetts .......................... 717/1 |

* cited by examiner

*Primary Examiner*—John Breene
*Assistant Examiner*—Debbie M Le
(74) *Attorney, Agent, or Firm*—Leydig, Voit & Mayer, Ltd.

(57) ABSTRACT

A container independent data binding system that independently facilitates data binding by way of a binding agent object on behalf of any data consumer and/or data source that conforms to the necessary interfaces and protocols. The binding agent facilitates data binding and transparent data access for any visual and/or non-visual object, in addition to control data verification for client-side control validation independent of a container, binding collection for non-data aware objects that can benefit from data binding, data conversion and formatting to control User Interface displays in the context of data binding, and repeater control to facilitate a list view for visual objects, for any object that requires and requests access to these features rather than individually implementing these features without binding agent support.

16 Claims, 3 Drawing Sheets

CONTAINER INDEPENDENT DATA BINDING SYSTEM

FIELD OF THE INVENTION

This invention relates to the field of data processing systems, and in particular to a global data binding system that facilitates data binding between a data consumer and a data source in a manner that can be independent of any container that may be associated with the data consumer.

PROBLEM

Data binding is the technique of creating a logical association or link between a data consumer and a data source. A data consumer is typically implemented in a container and uses data in a manner that can include, but is not limited to, displaying data on a display screen by way of a display mechanism, manipulating data, or associating data with properties of non-visual objects. A container is a type of component that contains one or more other components within a component family hierarchy, and can include but is not limited to a viewer or other visual object on a display screen such as a button, data entry field or form, and/or a list box. The display mechanism is an object referred to as a bound control that has properties that include data presently being displayed, background color, title, and other visible properties that can each be linked to a different data source. For example, the title of a bound control may be linked to a first data source, and the data displayed within the bound control may be linked to a second data source. A bound control is responsible for displaying properties to a user so that the user may view or modify the properties of the bound control.

A data source typically includes a data store, a data source control, and a cursor. A data store is typically a non-volatile storage device that on which data persistently resides often in a tabular row and column form called records and fields. A data source control is an object that is the interface between the data consumer and the data store that controls the display and implementation of data manipulation options. A cursor is an object that maintains a subset of the data store called a result set of a query, and maintains a present data item location indicator called a currency. The cursor supports operations that can be performed on a result set from the data store that include, but are not limited to, retrieving a record from the result set at a present location called the currency, modifying a record at the currency location, and moving the currency to refer to a desired record of a result set.

Figure 1:
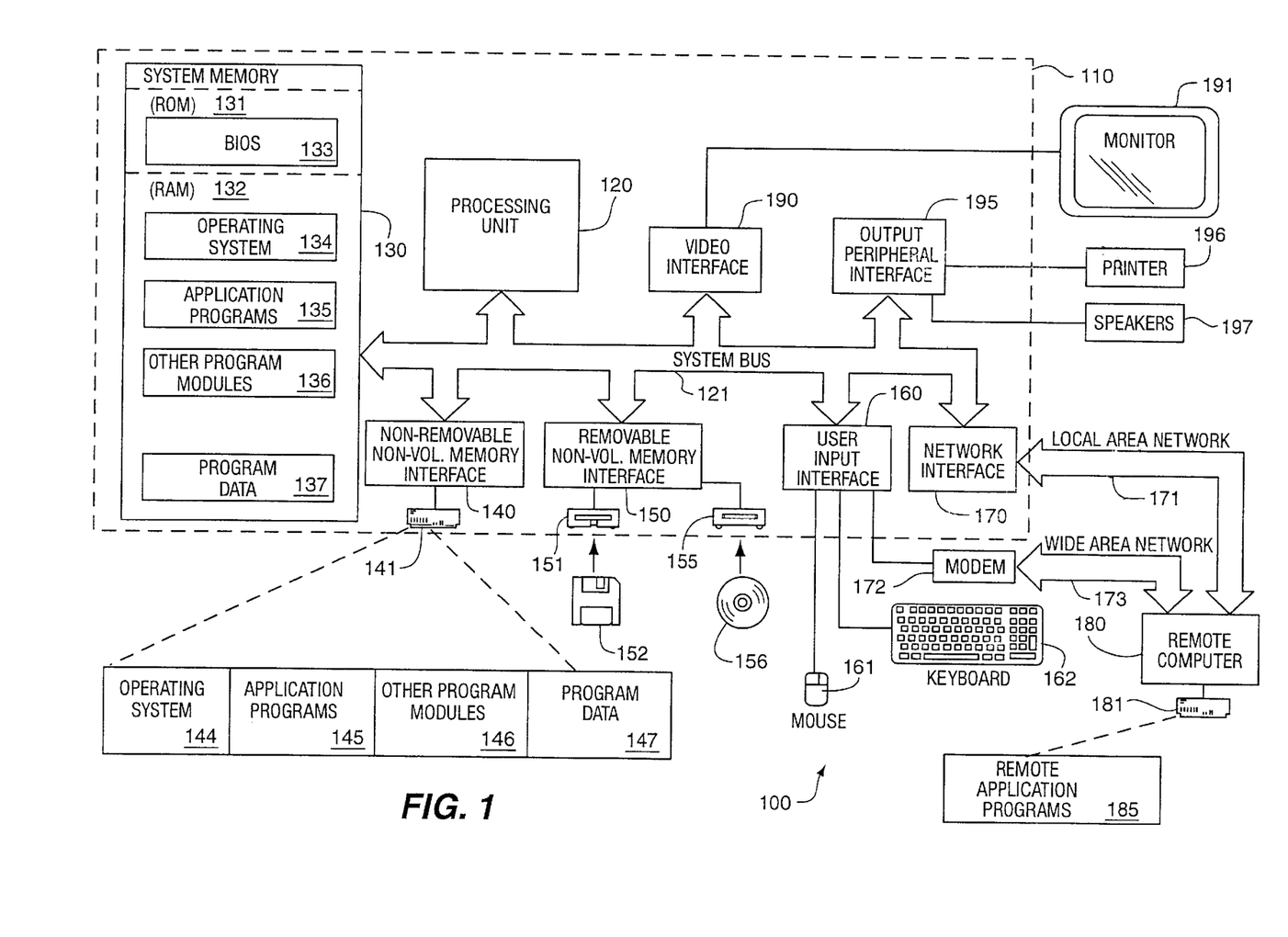
FIG. 1 illustrates an exemplary computing system environment in block diagram form on which the present invention could be implemented.
Figure 2:
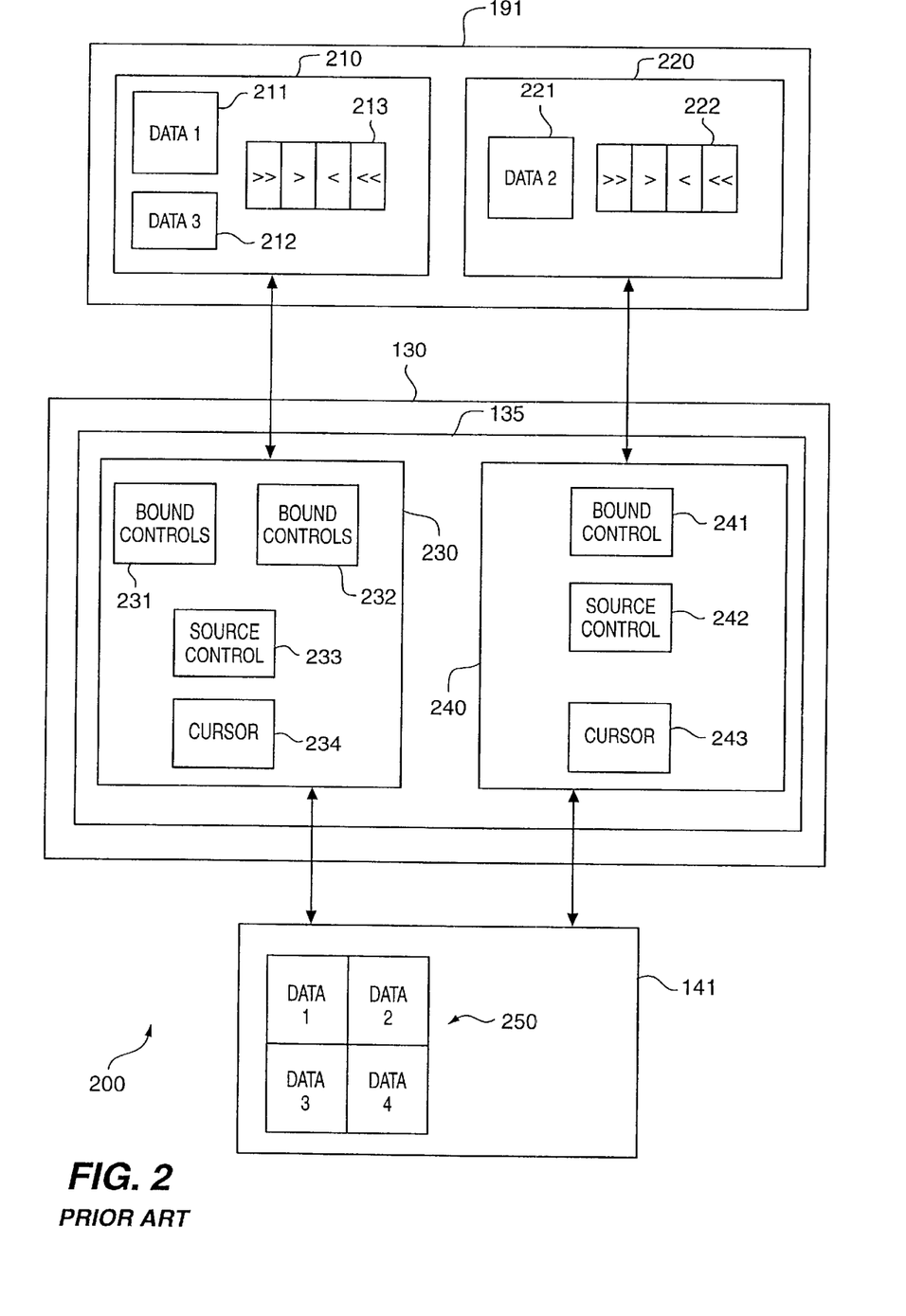
FIG. 2 illustrates an example of an existing data binding system in block diagram form.

FIG. 2 illustrates an example of an existing data binding model 200 in block diagram form. Note that the context of the basic computing system components identified with 1xx series reference numbers are disclosed in further detail with the text accompanying FIG. 1 found in the Detailed Description of the Invention section of this document.

Display screen or monitor 191 is illustrated as displaying two display areas 210 and 220 that are also referred to as containers. The visual components 211–213 within display area 210 are controlled by container application 230 of the application programs 135 in system memory 130. The visual components in the present example include, but are not limited to, user-visible bound controls 211 and 212, and a user-visible data source control 213. The binding components 231–234 of container application 230 can include, but are not limited to, a binding control 231 that controls user-visible bound control 211, a binding control 232 that controls user-visible bound control 212, a data source control 233 that controls user-visible data source control 213, and a cursor control 234. Similarly, the visual components 221–222 within display area 220 are controlled by container application 240 of the application programs 135 in system memory 130. The visual components in the present example include, but are not limited to, user-visible bound control 221, and user-visible data source control 222. The binding components 241–243 of container application 240 include, but are not limited to, a binding control 241 that controls user-visible bound control 221, a data source control 242 that controls user-visible data source control 222, and a cursor control 243. Both container applications 230 and 240 are operatively connected to the data 250 in the non-volatile secondary data store 141. The binding components within the respective container applications 230 and 240 are internal binding arbiters between display areas 210 and 220 as data consumers, and data 250 in data store 141 as the data source.

The operational aspects of data binding can be appreciated by considering a situation where a data consumer that has a local copy of data from the data store of a data source, and the data consumer has the data displayed on a display screen under the control of a data source control. Because the data consumer and the data source are logically linked, modifications to the data consumer's copy of the data result in an update of the data of the data source. Similarly, modifications to the data source's copy of the data result in an update of the data of the data consumer. However, existing data binding configurations and their operational techniques to facilitate data binding such as that illustrated in the FIG. 2 example, are undesirable for several reasons.

One reason existing data binding techniques are undesirable is because existing data binding models are unique to each container application. This data binding uniqueness requires a programmer to duplicate a relatively standard service from one container application to the next and to customize the container application to accommodate a specific data access protocol and interface set. Generating a customized data binding implementation for each application is inefficient and results in programming language code that is dedicated to a given data access method in addition to being difficult to maintain by programmers unfamiliar with the original container design and/or data binding model. Further, a customized data binding implementation results in data binding dependencies on specific data access methods. Such dependencies limit the expandability and/or adaptability of the data binding model to new data access interfaces without significant binding logic changes. For these reasons, existing data binding models and their uniqueness from container to container are undesirable.

Another reason existing data binding techniques are undesirable is because existing data binding models are visual container dependent so that there is no way to accomplish data binding for non-visual objects. Non-visual objects that can benefit from data binding can include, but are not limited to applications that do not have a user interface such as middle-tier business logic objects in a three-tier system. Due to this limitation, existing data binding models and their limited applicability to visual objects are undesirable.

Another reason existing data binding techniques are undesirable is due to the lack of programmer control over application details that occurs once the binding relationship between the data source and the data consumer is established. The lack of control is the result of the container's internal binding arbiter that buffers and mediates all data access communication and interactivity between every component of the data consumer and every component of the data source. For this reason, existing data binding models are undesirable.

For these and other reasons, there exists an ongoing need for a uniform system of supporting data binding and data access features for visible and non-visible components across multiple applications. A system of this type has heretofore not been known prior to the invention disclosed below.

SOLUTION

The present invention solves the above identified and other problems by a container independent data binding system that independently facilitates data binding by way of a binding system object, also known as a binding agent, that is accessible to any visual and/or non-visual component. The binding system is established as an independent Component Object Module (COM) object that is separate from any data consumer or data source client component thereby freeing the client components from the need to individually implement data binding or data access features.

The binding system exposes standard COM object interfaces for use by any client component provided the client component follows established interfaces and protocols. The features provided by the binding system include basic data binding features for an entire data source or for data members of data sources, as well as the transparent data access needed for a data consumer to access the data regardless of the data consumer being a visual and/or non-visual object. Additional binding system features include, but are not limited to and are not required to include, control data verification facilities for client-side control data validation, binding collection for non-data aware objects that can benefit from data binding, data conversion and formatting to control User Interface displays in the context of data binding, and repeater control to facilitate a list view for visual objects, for any object that requires and requests access to these features rather than individually implementing these features without binding system support.

The basic data binding and data access features can be separate from a container due to Binding Collection that allows multiple data consumers to bind to the same data source without each data consumer having specific data awareness or internal data binding implementations. However, Binding Collection is not necessary for objects that have independent knowledge and/or ability to perform their own data binding. The basic data binding and data access features are supported by COM interfaces that include IDataSource and IDataSourceListener. In addition, the binding system is based on an interface arbitration mechanism so that a data bound object can optionally inquire about the data access interfaces that are available when deciding how to access a data source. The data access interfaces allow growth in the types of data access support without requiring changes to the basic data binding mechanisms.

The binding system can provide control data validation to perform field-by-field validation as needed in response to user supplied input. The control data validation features are supported by COM interfaces that include IDataValidate and IDataValidateNotify.

The binding system can provide data repeater control by using data binding in conjunction with a visual object having properties to support a list-style presentation of data that frees the visual object from having to know that a control is being repeated for multiple data items.

The binding system can provide data conversion and/or formatting by way of a DataFormat property to support fine-grained user control over the basic form and presentation of data as the data is being moved between the data source and a data consumer.

These and other container independent data binding system features are disclosed in further detail in the detailed description of the invention below.

DETAILED DESCRIPTION OF THE INVENTION

COMPUTING SYSTEM ENVIRONMENT—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multiprocessor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The numerous peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neuro-stimulated sensor, and scanner, and may require other interface and bus structures such as a parallel port, game port or a Universal Serial Bus (USB) for example.

User input/output devices supported by video interface 190 can include a display monitor 191 or a video camera.

Output peripheral interface 195 supports output devices such as printer 196 and speakers 197.

Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer. 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

CONTAINER INDEPENDENT DATA BINDING
ARCHITECTURE—FIG. 3

Figure 3:
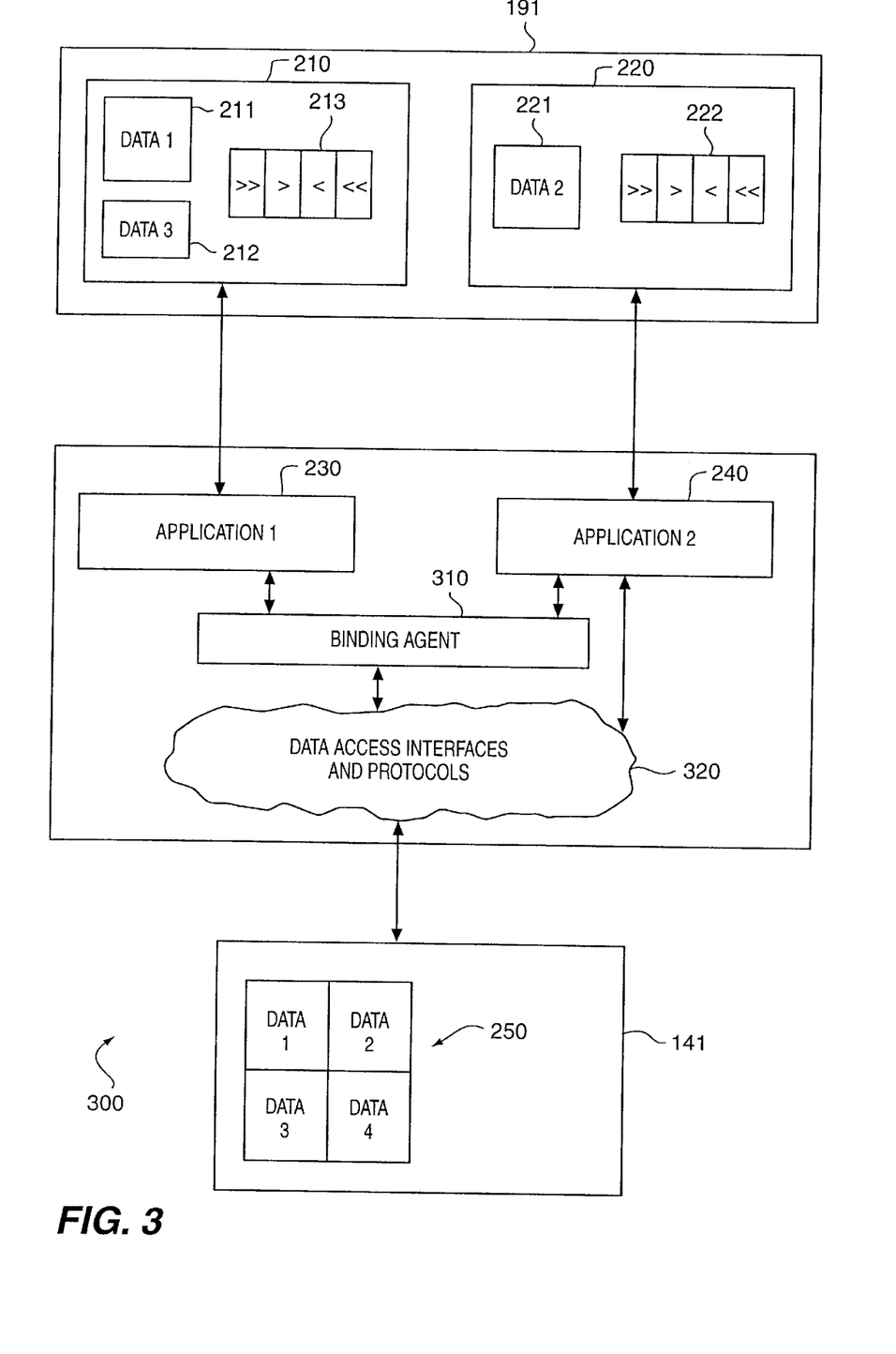
FIG. 3 illustrates a container independent data binding architecture example in block diagram form.

FIG. 3 illustrates a container independent data binding architecture 300 in block diagram form. The container independent data binding architecture 300 is configured in a manner such that both visible and non-visible data consumers can bind directly to a data source, and that more than one data consumer can be bound to the same data source, at the same time. Where more than one data consumer is bound to a given data source, the multiple data consumers operate in cooperation to display and update the common data source object.

The architecture 300 includes the same fundamental data consumer and data source components as previously disclosed in FIG. 2 that include the visible data consumers in display areas 210 and 220, the basic container applications 230 and 240, and data 250 in the data store 141. However, the basic container applications 230 and 240 in architecture 300 do not include the duplicative application specific binding architectures illustrated in FIG. 2. Instead, architecture 300 includes an independent binding system object 310, also known as a binding agent, that exposes standard binding interfaces for use by visual or non-visual container application independent of any container. The binding system 310 also acts as a universal data access interface and includes additional format and validation features beyond the basic binding service as disclosed in further detail in this document.

The binding system 310 exposes a uniform set of COM interfaces and protocol for use by data consumers and data sources to facilitate container independent data binding. The interfaces include, but are not limited to, IDataSource and IDataSourceListener. It is important to note that the data binding interfaces of the present invention are data access method neutral and programming language neutral to that data binding features are useful regardless of the data access methods used and the programming languages used. One example of a common data access method is the Object Linking and Embedding Data Base (OLE DB) access method by Microsoft Corporation. Examples of object oriented programming languages that can generally be used to implement programming language neutral programs include, but are not limited to, JAVA by Sun Microsystems, C++ by AT&T Bell Laboratories, and VISUAL BASIC 98 by Microsoft Corporation.

It is important to note that prior to the container independent data binding system of the present invention, data binding was limited to contained objects. This limitation excluded an entire class of non-contained objects that are typically not visual objects used in non-visual applications such as in server-side logic. In a three-tier business object model, it is common to encode business logic in specialized objects that hide the details of the data store schema. One problem was that when writing these objects, it was common to encapsulate operations on logical objects.

For example, an Employee object may expose properties that represent the attributes of a particular employee: First Name, Last Name, Social Security Number, and Department. The Employee object might also expose methods such as FindByName that could be used to locate a particular employee in the data store. Once the desired employee was found, the Department property was accessible. However, data binding was typically not available for use with such an Employee object although the use of data binding might be desirable.

With access to the binding system 310, any data consumer object can bind it's own properties to particular fields of a data source. The data consumer can then search the data source for a record and when the record is found, the current row can change and the corresponding property values updated. For example, if the user of the Employee object sets the Department name, then the value is automatically written to the data store because proper binding system interfaces and protocols are used such as the IPropertyNotify-Sink::OnChanged interface in this case. However, other objects such as a text box require the use of proper binding system interfaces and protocols such as the IPropertyNotifySink::OnChanged interface, for every keystroke input by a user. That is, in the case of the text box, the value is only written when the current row changes or the user moves off the field by changing focus as disclosed in further detail below. Thus, one important feature of the container independent data binding system is that the data binding mechanisms can be reused by changing the semantics of the binding system to a different binding collection mode so that property values of a object are written to a data store immediately if the proper interfaces and protocols are used. The result in the Employee information example above is that when the user of the Employee object sets the Department property, the data store is updated immediately without additional effort or independently implemented code by the data consumer.

Binding System Interfaces and Properties

Each data consumer and data source must adhere to an established set of data binding interfaces and protocols. For example, each data consumer is required to have a DataSource property and to implement the IDataSource interface to facilitate data binding between a data consumer object and a data source object. Note that a data consumer can have more than one DataSource property and any name can be used for each property. By setting the DataSource property, a data consumer can access an identified data source to bind to by way of the data source's IDataSource interface, and to further request a data access interface appropriate for that data source. The initial value of the DataSource property is typically NULL. An example of the programming language script code to set a DataSource property can appear as follows:

Set Chart1.DataSource=MyDataSource

Note, however, that setting a DataSource property by way of a programming language is not the only way to set up a data binding relationship between a data consumer and a data source. The data binding association can also be specified in other ways including, but not limited to, tags in an Hypertext Markup Language (HTML) file, or a property browser User Interface. For the non-script ways to set up data binding associations, it is the responsibility of a container to set the DataSource property on behalf of the user as needed.

Once a data consumer has established a data binding relationship with a data source, the data consumer specifies which data access interface it would prefer when requesting data by way of an Interface IDentification (IID). Examples of IID's include, but are not limited to the examples listed below:

IID_IOLEDBSimpleProvider
IID_IRowPosition
IID_IRowset
IID_ICursor
IID_IVBDSC

However, not every data consumer is required to support all IID interfaces in order to be interoperable with all data sources. For example, when the data source is hosted in a container and the container sets up the data binding relationship between a data consumer and the data source, then the container can be an intelligent one when obtaining the data access interface such that it can intervene and provide mappings if the data consumer requires an interface that the data source does not implement. Alternatively, if a data consumer only asks for IID_IUnknown, then the data source would return the interface that is most natural for the situation. However, when the data binding is achieved by way of programming language script code, then there may or may not be a container to intervene and a mapping must be manually supplied by creating a data source adapter object.

Each data source can have more than one set of data bound to more than one data consumer at one time. The set of data that is identified in a multiple binding situation is called a DataMember. A DataMember is a property that allows a data consumer to specify a data set by way of a user defined string name so that more than one data consumer can have a chart or table, for example, that is based on the same data from the same data source. An example of the programming language script code to set up a DataMember is listed below:

Let Chart1.DataMember="1998 Profit"
Set Chart1.DataSource=MyDataSource

Each data consumer is required to have a DataMember property and each DataMember string is specific to a DataSource property. It is up to the identified DataSource to parse the identified string and the string can identify any source including, but not limited to, a table name, query string, or Universal Resource Locator (URL) string. In the case where the data source has well known data members, the data source can be asked to enumerate each one by way of IDataSource::GetDataMemberCount and IDataSource::GetDataMemberName method calls that are defined below. The ability to identify the number and name of individual DataMembers of a data source provides a container with the ability to use a User Interface that lets a user choose the value from among a list. To facilitate such a choice, the type of the DataMember property is DataMember that is a typedef for a Basic STRing type (BSTR). The BSTR typedef allows a property browser to recognize the string property as a DataMember and to in turn generate a drop down list for example. However, since the format of a DataMember string is arbitrary, a user could be prompted to input a string in real time in addition to or as an alternative to selecting a string from among a list.

Operationally, each DataMember relationship is a two-way connection between a data consumer and a data source.

A data consumer can ask a data source for a particular DataMember. Once the data consumer obtains the data access interface for the DataMember, the data consumer can retrieve the actual data values as needed. Similarly, the data source can notify each data consumer of new DataMembers that are available, or that a DataMember has been refreshed, or that the data access interface has been retrieved for a particular DataMember.

If the data source has a default DataMember, the default can be obtained by identifying an empty string ("") or NULL BSTR as the DataMember property. A default string is typically never enumerated by the data source. However, most data sources have only one data member and the default member string ("") or NULL BSTR is sufficient to identify that one data member.

DataSource and DataMember Notifications

Even though the DataSource and DataMember properties have been set correctly, limited data availability from a given data source may exist. In a case where there is limited data availability a data source will return a NULL in response to an IID request for a data access interface. A data consumer that receives a NULL typically treats the notification as if the DataSource property is NULL and there is no data available. Whether a given set of data is available, unavailable, or has been completely refreshed for a particular DataMember, the data source notifies the data consumers through the IDataSourceListener::OnDataMemberChanged method as defined below. At this point, the data consumer will use IDataSource to attempt to get the requested data. This notification scheme is designed to allow the IUnknown of the DataMember to change when refreshed. For incremental changes, the data source should rely on the normal data access mechanisms for notifications such as IRowsetNotify in OLE DB for example.

Each data source is required to return the same IUnknown pointer each time a data consumer asks for a particular DataMember. Once the notification IDataSourceListener::OnDataMemberChanged has been initiated, then it is the responsibility of the data source to return either the same or a different IUnknown. Comparison of two DataMember strings should be done in a case insensitive manner.

Data sources generally put off getting data for a particular DataMember until it is requested. However, it is possible for a data member to be obtained asynchronously by returning NULL when the data is requested, but then later using IDataSourceListener to indicate that status of the DataMember has changed. Then, when a data consumer asks for the data in response to the notification, the data will be available. Note that for a DataMember to be available, only a portion of the data needs to be available which then relies on the asynchronous protocols in the data access mechanism.

Since a data source can choose to provide an enumeration of a DataMember and the list of available members might change, IDataSourceListener also has the ability to notify interested parties such as a property browser, for example, that the data set has changed. However, keeping this list up to date with all DataMembers in use is not a requirement. The enumeration is only intended to list well-known DataMembers to the user at design time, not to exhaustively list every valid or possible data member value.

IDataSource and IDataSourceListener Interfaces

The interface definition for IDataSource and IDataSourceListener are listed below. Note that the type library definition is DataSource and DataSourceListener to be friendly with certain commonly used programming languages including, but not limited to, Java and Visual Basic. However, there are #defines for these types to IDataSource and IDataSourceListener for other programming languages.

IDataSource::getDataMember

This method returns a data access object such as a row position or an OLE DB simple provider data object, for the given DataMember string. If the necessary data access object is not presently available, then NULL is returned for the IUnknown. If the DataMember string is invalid, then an appropriate error message is returned by way of ISupportErrorInfo. The default DataMember is specified either by having a zero length string or a NULL string which are considered as equivalents in this case. The caller can specify which type of data access object is of interest by specifying an IID of the main data access interface for the object, such as for example, IID_IRowPosition, IID_ISimpleTabularData, IID_IRowset, IID_ICursor, or IID_IVBDSC. If the data source does not support the desired data access object, then E_NOINTERFACE is returned to allow a data consumer the opportunity to try multiple interfaces in order of preference. When asked for IID_IUnknown, a data source returns whatever data access object that is a natural best fit. Note that the return value from the IID_IUnknown function is always an IUnknown pointer, regardless of the IID specified. It is up to the caller of the method to inquire as to the desired or appropriate interface. That is, the IID parameter does not specify which interface, but rather which data access object type to return.

IDataSource::getDataMemberCount

This method returns the number of well-known data members in a given data source. A zero value is returned for data sources that do not support enumeration. Alternatively, the number of well-known data members is returned in response to this method call.

IDataSource::getDataMemberName

This method returns the name of a particular well-known data member. A zero-based index parameter must be specified for this method, and the index must fall between 0 and GetDataMemberCount—1 or this method returns an error. The default data member ("") is never returned from this method.

IDataSource::addDataSourceListener

This method adds a listener to a notification list, however, checking for duplicate list items and returning an error are optional features. If the data source knows it will never fire notifications because, for example, the DataMembers are always available, then this method need not be implemented and NOERROR can be returned. However, if a notification is provided, then the notification must be multicast. An HRESULT returned from the multicast is ignored and does not abort the multicast.

IDataSource::removeDataSourceListener

This method removes a listener from the notification list. However, checking whether the listener has in fact been added and returning an error as appropriate, is optional. If there are duplicates on the list, then one of the duplicates is removed, although which one was the one removed is not specified. If a given data source does not fire notifications, then the data source can return NOERROR from this method.

IData SourceListener::dataMemberChanged

This method notifies a data consumer that an existing DataMember has presently become available, unavailable, or refreshed. The data consumer should release it's hold on any data access interfaces for the specified DataMember, such as IRowset or IRowPosition. Note that the method IDataSource::getDataMember must called to retrieve the subject data as appropriate.

IDataSourceListener::dataMemberAdded

This method notifies a data consumer that a new DataMember has been added to the enumeration of well-known DataMembers for given data source.

IDataSourceListener::dataMemberRemoved

This method notifies a data consumer that a DataMember has been removed from the enumeration of well-known DataMembers.

Binding System Operational Details

The data binding architecture 300 of the present invention is container independent. Because data binding by way of the binding system 310 can be container independent, any data consumer object can choose to use data binding to its advantage regardless of the data consumer object's composition or properties. Stated another way, a data consumer object can either implement its own customized version of data binding within an application, or take advantage of all or any part of the data binding methods exposed by the binding system 310. However, certain interfaces and protocols must be followed when using the binding system 310.

An object such as a table or spread-sheet can be implemented with sufficient intelligence to get, display, and edit data from a data source by way of traditional data binding techniques and data access methods because such objects are typically designed with these features in mind. However, less complex objects such as a text box typically only display one or two data values at a time and a text box is typically not data access aware. For these and other reasons, text boxes and other less intelligent and/or complex objects do not understand data binding and therefore can rely on the binding system 310 to perform data binding functions and data access functions on their behalf. In such a scenario, the binding system 310 is itself the data consumer rather than the text box because the data source communicates directly with the binding system 310 and the data source is not aware of the text box itself.

The binding system's operational conventions include, but are not limited to, the following points. First, the values or contents of an object must be exposed as properties on the object. Second, when an object modifies a property, the object must notify other interested objects such as the binding system 310 itself by way of the IPropertyNotifySink interface. Third, prior to modifying a property an object must notify other interested objects such as the binding system 310 itself by way of the IPropertyNotifySink::OnRequestEdit interface to give the other interested objects a chance to object to the modification.

If an object has conformed to the above identified conventions, then the binding system 310 can perform the following tasks on behalf of a requesting object. First, the binding system 310 can track the current row position using the designated data access interfaces such as, for example, the IRowPosition interface in OLE DB. Second, the binding system 310 can track which field in a data source is tied to a property of the requesting object and whether the object has modified that field. Third, the binding system 310 can track which property on the object is the one that is bound. Fourth, if the object has modified a field in the data source and the modification has resulted in a row change or tabbing outside the object's visual display field, then the binding system 310 is made aware of the situation by way of the data binding Control Data Validation features and the property value is saved in the relevant data store. Control Data Validation features are disclosed in further detail below. Fifth, the binding system 310 can automatically set the property of an object to the value of a new row in response to a change in the current row position in the data source. Sixth, for read-only data sources the binding system 310 can object to any data modifications proposed by an object except for those modifications that are generated as a side effect of setting properties on the object. Seventh, if the value of the current row in a data store has changed, then the binding system 310 can automatically update the property of the object appropriately.

Another reason the binding system 310 is operational as a separate container independent object is because its object model is based on the idea that objects that require data binding can be added together as a collective. For this reason, the binding system 310 and/or the binding system facilities are referred to as a Binding Collection. A Binding Collection is a collection of objects that are bound to the same data source. For example, referring to the text box example above, the programming language code to set up data binding for a text box in a data binding collection could look like the following.

Dim bc As New BindingCollection
bc.Add TextBox1, "Text", "Field1"
Set Bc.DataSource=DataSource1

In the programming language code above, the TextBox object is added to a Binding Collection and the text property is specified as being bound to the current row of the column named "Field1" in the DataSource named "DataSource1". For this reason it is possible for the binding system 310 to be separate from a container in the same manner as it is possible for a data consumer to be separate from a container.

Binding System Control Data Validation Feature

Control Data Validation features of the binding system 310, hereinafter referred to as validation, provides the ability to check the values of a control and/or to prevent focus from moving from the control if the control values involved are invalid. Examples of a control include, but are not limited to, directional controls, event controls, and operational controls that are commonly accessible to a user by way of a User Interface. In general, validation can occur in the context of a container or by way of the binding system 310 itself at a time when focus is changing from one component to the next among a family of components. The usefulness of validation is available if it is needed. That is, a user may not want validation to occur if context is switched to another application or document. However, validation may be desirable when a user is changing focus between controls within a particular document or application. For these reasons, it can be the task of the active container to define the context in which validation should occur, and the present control data validation methods facilitate the validation in the context of a data binding environment.

There are several ways that focus can change that include, but are not limited to, keyboard input by user, multi-directional pointer input such as a mouse, and/or a focus change embedded in the programming language script code. In each case the active container knows what control presently has focus or to which control focus is going, because the active container owns the message loop. What the container does not know is whether the change in focus might cause a validation error.

For example, if focus is changing to a cancel or help button, then validation may not be necessary because no substantive exchange of data is occurring. However, changing focus to an OK button may be cause for validation to occur because a substantive action may be initiated. To determine whether or not validation should occur, a container can expose a Boolean CausesValidation property on the extender to allow the user the opportunity to decide what controls require validation. Alternatively, a container could determine whether or not validation should occur by looking at the ID of a button to see if it is of an IDHELP or IDCANCEL type. Other alternatives to determining may also exist. Nevertheless, once a container has determined that validation is desirable, the container can choose to initiate a validation event on behalf of the control that requires the validation. The container will also allow other objects including, but not limited to the binding system 310 or the control itself, to participate in the validation sequence. If any listener objects to a positive validation result, then focus does not change.

Once validation is complete, the active container notifies all interested objects that the value at issue can be safely written to a data store under the direction of the binding system 310 or the control itself. However, if the writing of a value to a data store fails, then the focus does not change. For example, the active container can notify the object being validated or from which focus is moving away. The validated object can then write data to the data store, provided that other bound objects have also been notified and given the opportunity to object. Once the values in the data store have been updated, the active container can dispatch the message or continue the change focus request, and the focus can change normally.

There are times when an object might wish to force validation even though focus is not changing. An example of this situation is when the current row in a data store changes and simple bound controls require updating even though the focus has not changed. In this case, either the control or an external entity such as the binding system 310 can ask the container to initiate the validation sequence.

Validation Interfaces

Each container can implement a set of interfaces on its control extender object to facilitate validation. An example of the programming language script code for this situation is listed below.

```
coclass CExtender
{
    interface IData Validate;
    [source] interface IData ValidateNotify;
    ...
    (other normal extender interfaces)
};
```

To use IDataValidate or sink IDataValidateNotify, an object must have access to the extender of the control being validated. This is a simple operation in the case of the control itself. For an arbitrary external object such as the binding system 310, there exists a sequence of steps to follow to obtain the extender. Given the control object, the binding system 310 can initiate a query interface for IOIeObject. If the query interface for IOIeObject is successful, the IOIObject::GetClientSite method is called. Alternatively, if the query interface for IOIeObject is unsuccessful, then the binding system 310 can initiate a query interface for IObjectWithSite and call IObjectWithSite::GetSite. Once the site has been obtained, the binding system 310 can initiate a query interface to call IOIeControlSite::GetExtender to obtain the object that supports IDataValidate or the IConnectionPointContainer for IDataValidateNotify.

Validation Interfaces and Operational Steps

The interface IDataValidateNotify is exposed as an event interface on the extender. The extender implements IConnectionPointContainer and multicasting for the IDataValidateNotify interface. Both the control and other external objects such as the binding system 310 can choose whether or not to advise these notifications. Unless controls are complex bound, external objects such as the binding system 310 do not have to monitor these notifications. An example of the IDataValidateNotify interface is as follows:

```
interface IDataValidateNotify
{
    HRESULT OnData Validate( );
    HRESULT OnDataUpdate( );
};
```

Operationally, all of the following steps must succeed before focus is allowed to move away from the control:

1) IDataValidateNotify::OnDataValidate—This notification is initiated when a container has decided that validation should occur for the control. Objects that monitor this event can perform validation of all the bindable values of the control without actually modifying the values. If validation fails, however, then an error is returned and the focus is set to the part of the control in error. Once an error has been returned, then the container stops the notification sequence and returns the error to the object that initiated the validation. In the case where user interaction initiated the validation, a container can display the error to the user. If all the monitored events are successful, then the container is free to initiate validation operations.

2) Container specified validation events—Once OnDataValidate is successful, the container can initiate a validation event to the programming language script author on behalf of the control. Typically this event will contain a ByRef cancel parameter that allows the script author to initiate validation and cancel the event if validation operations fails. If the event is not canceled then the container can initiate OnDataUpdate as disclosed below.

3) IDataValidateNotify::OnDataUpdate—This notification is initiated when a container specified validation event has successfully completed. OnDataUpdate is designed to give objects a chance to write any modified data values into the data store. It is the responsibility of the objects monitoring this notification to know which values have been modified. Listeners for this notification return an error if the values being written are not successfully written to the data store. When the container receives an error, it stops initiating the notifications and returns the error to the object that initiated the validation sequence.

IDataValidate Interface

IDataValidate is an interface on the control extender object that allows the control or any other entity to initiate the validation sequence even though focus is not changing. An object calls the IDataValidate::Validate method to start the validation sequence as follows.

```
interface IData Validate
{
    HRESULT Validate( );
};
```

If an error occurs in the validation sequence, then the error is returned from the Validate method. It is the responsibility of the object to handle or display the error as appropriate. For example, if the binding system 310 initiated the validation sequence due to a row change, the binding system 310 returns the error to OnRowPositionChange notification that in turn propagates the notification back to the object initiated the change.

Binding System Data Formatting Feature

Data formatting is a feature provided by the binding system 310 to specify and implement desirable data conversion and/or data formatting prior to delivery of the requested data from the data store to the data consumer. Although a common default data conversion interface IDataConvert is typically available from a data source for any data consumer to use, it is also common for a data consumer to take additional steps to format data retrieved from a data store. Providing the option for a data consumer to user the binding system 310 data formatting features can insure consistent availability of commonly used conversion and formatting features across a variety of data stores and data consumers without each data store and/or data consumer having to individually implement these common features.

For an example of the problem solved by the data binding formatting features, a data source may have a DBTYPE_DECIMAL value, and the data consumer asks for a VARIANT. The data source may use IDataConvert to return a VARIANT, however the data consumer must then take the DECIMAL value and convert it to a string while applying the appropriate number of decimal place formatting, adding a currency symbol, and generating a final display value. The final formatted display value is then drawn on a display screen or set into an edit field as appropriate for the application. However, the binding system 310 can provide the conversion and formatting features as needed.

Formatting Objects

To give an end user fine grain control over operational details that occur between the time data is retrieved from the rowset of a data store and when the data is presented on a display screen, the binding system 310 provides format objects that can be attached to the data consumer. These format objects typically have properties, methods, and events that allow the end user to dictate the formatted end product.

The format objects are set into a DataFormat property on the data consumer object that corresponds to a particular bound data set such as a column for example. If the data consumer is simple bound, then there may be a DataFormat property directly on the object and the binding system 310 uses the format object on behalf of the simple bound controls it is serving. In the case of a simple-bound control there is a DataFormat property, although it is on the extender not on the control itself. The extender then delegates the property to its underlying binding collection which implements the DataFormat property. In the case of a simple-bound business object, there is no DataFormat property on the business object because the DataFormat property is on the binding collection. For a complex-bound object, the complex-bound object itself is responsible for having its own property.

Once the format object has been set, the data consumer uses the object to establish the HACCESSOR for the data, and the format object dictates how the data is represented. The data consumer need only deal with the data as if it was a VARIANT.

A format object can also have a property page to permit an end user the opportunity to specify formatting at design time. A property page is associated with the DataFormat property by way of the existing IPerPropertyBrowsing interface. Note however, that format objects support bidirectional conversion and formatting operations. That is, that format objects are allowed to apply formatting to a value from a column, for example, but they must undo this formatting before the value is written back to the data store. For example, a format object could turn the integer value 1 into the string value "one", but would need to turn the string value "one" back into the integer value 1 when the data is written back to the data store.

Standard Format Object Example

A set of common operations exist that users typically perform on data types that include, but are not limited to, specifying a number of decimal places, financial currency symbols, time and date formatting, and the like. These common operations are combined into a standard format object StdDataFormat that can be made available in any manner including, but not limited to, a product independent fashion such as a Dynamic Link Library (DLL) MSSTDFMT.DLL. The StdDataFormat interface can have formatting options that can include, but are not limited to: 1) general formatting such as default formatting for column types; 2) numeric formatting such as #, 0, %, positive, negative, null support, and control panel settings, string formatting: uppercase, lowercase, null support; 3) time formatting: h, hh, hhh, m, mm, s, and AM/PM; 4) date formatting such as mmm, d, yyyy, yy, first week of year, and first day of week support; 5) Boolean formatting such as user specified true/false/null values as variants; 6) checkbox formatting such as automatic mapping between DBTYPE_BOOL values and OLE_TRISTATE; and 7) blob formatting such as the ability to persist picture objects and any COM objects that support IPersistStream.

In addition to the above identified formatting functionality, all of which can be edited through a property page, and end user can be provided with the ability to write events in the programming language code for the StdDataFormat object in order to connect into the data transfer path before and after the formatting occurs to give the end user ultimate control over how data is presented without having to implement the formatting features with each container application.

IDataFormat Interface

The underlying interface that the data consumer must use is the IDataFormat. All format objects implement this interface.

```
cotype DataFormat
{
interface IDataFormat;
    [source] IPropertyNotifySink;
};
```

The following flags are used with IDataFormat::GetBinding

```
#define DATAFORMAT_FGETDATA    0 x 0 //Return a SetData binding
#define DATAFORMAT_FSETDATA    0 x 1 //Return a GetData binding
```

```
interface IDataFormat: public IUnknown
{
HRESULT GetBinding([in] VARTYPE vtHint, [in]
    DWORD rgfDataFormat, [in] IUnknown* prowset,
    [in] DBCOLUMNINFO* pcolinfo, [out] DBBIND-
    ING* pbinding, [out] ULONG* pcbSize, [out]
    DWORD* pdwcookie);
HRESULT GetData([in] DWORD dwCookie, [in] void*
    pvFrom, [out] VARIANT* pvarTo, [in] Idispatch*
    pdispobject);
HRESULT SetData[in] DWORD dwCookie, [in]
    VARIANT*pvarFrom, [out] void* pvto);
HRESULT ReleaseData(f[in] DWORD dwCookie, [in]
    void* pv);
HRESUL T ReleaseBinding([in] D WORD dwcookie);
};
```

IDataFormat::GetBinding Method

The IDataFormat::GetBinding method is used by a data consumer to set up HACCESSOR(s) to access a particular field. The GetBinding method passes data format information and expects to receive in return a DBBINDING structure that defines how the data should be formatted for SetData, GetData and ReleaseData. The offsets specified in the DBBINDING structure are relative to 0. The pdwCookie parameter gives formatting objects a chance to associate state with a particular binding as further detailed in the text below related to keeping state. The prowset parameter gives the format object a chance to inspect a rowset, for example, to determine how to set up the binding, by way of interfaces such as IConvertType or IRowsetInfo. However, a format object does not need to maintain control of a set of data after a GetBinding call is initiated.

The pcbSize parameter is filled with the size of the local memory that a data consumer must allocate on behalf of the format object. The vtHint parameter is the type of the VARIANT that the data consumer is expecting, or VT_EMPTY meaning the data consumer does not care. The vtHint parameter facilitates the decision of how the conversion or formatting is completed. The rgfDataFormat parameter contains additional flags related to how the data binding is created. If DATAFORMAT_FSETDATA parameters are passed, then the format object creates a write-accessor, otherwise the format object creates a read accessor.

IDataFormat::SetData Method

The IDataFormat::SetData method is available to a data consumer when data has been modified and the data consumer has decided to update the data set from which the modified data originated. For example, the IDataFormat::SetData method can be called immediately prior to the time when IRowsetChange::SetData is called for a modification to the data in a rowset. The pvarFrom parameter is a value obtained by way of a User Interface, and is examined by the IDataFormat::SetData method before conversion and formatting is applied and the result copied into the pvTo parameter according to the offset specified in the DBBINDING structure in GetBinding. If this method completes successfully, ReleaseData is called to free values inside of pvTo.

IDataFormat::GetData Method

The IDataFormat::GetData method is called by a data consumer when a field value is read out of the data store requires converting to a VARIANT so that the value can be displayed on a display screen. The pvarTo parameter is updated based on the data in the pvFrom parameter. The layout of the pvFrom parameter is based on the offsets specified in the DBBINDING structure in GetBinding. Regardless of whether the lDataFormat::GetData method complete successfully or not, the ReleaseData method is called to free values stored in pvFrom in the event IRowset::GetData completed successfully.

The pdispObject parameter is optional and is passed back to data consumers during a format event. Passing the pdispObject back to a data consumer allows the data consumer to operate on the object subsequent to the actual data retrieval and before the completion of the GetData process and the display of data in a display screen. Control over the data at this level facilitates the creation of interesting controls such as grids and tables in Visual Basic. For example, control over data at this level can allow a data format object to fire an event which can then take the pdispObject as a parameter to implement a line of code such as the following:

if value <0 then pdispObject.BackColor=red;

Alternatively, in the case of a grid or table, the object being passed may not be the grid itself but a "cell" object that would turn red in response to the above identified programming language code example. Stated another way, the format object can affect the presentation of data in manners other than simple string manipulations for example.

IDataForrnat::ReleaseData Method

The IDataFormat::ReleaseData method is used by a data consumer to release any data values embedded in the local memory of the data consumer for a given field. For example, if the GetBinding call of a formatting object has specified DBTYPE_VARIANT in the wType field of the DBBINDING structure, then the IDataFormat::ReleaseData method calls VariantClear(pv).

IDataFormat::ReleaseBinding Method

The IDataFormat::ReleaseBinding method is used by a data consumer to release a Cookie. This method is typically used when the data consumer no longer has a need for the accessor.

Keeping State Information

Formatting objects do not keep any state information relating to a particular binding as member variables. Thus, the same format object instance can be reused for different sets of data, different bound objects, and/or different columns of bound objects. However, it is up to the data consumer to manage the HACCESSOR's, DBBINDING, and DBCOLUMNINFO structures, in addition to the local memory allocated to the data consumer for the data values. The Cookie parameter returned by GetBinding that passed to any one of the rest of the above identified mentioned methods, is intended to facilitate a way of associating object state with a particular binding as necessary.

Formatting Interface Notifications

Format objects can have an object model that permits an end user to change how the format object behaves. This means that the DBBINDING parameter that is returned from GetBinding may be unnecessary if the end user changes properties on the format object. To avoid this situation, the format object can initiate the IpropertyNotifySink::OnChanged method when a properties change is detected. However, the end user of a format object must be synchronized with these events in addition to re-creating its HACCESSOR upon initiation.

Formatting Implementation Example

The following example illustrates how a format object works with data from a data store. Error handling on this example is omitted for clarity of the example. Note that only the steps in bold text need to be executed each time data is retrieved from a data store such as a rowset.

// Ask the data format object to create the DBBINDING structure IDataFormat* pdf;

DBBINDING binding;

DWORD cbAlloc;

pdf->GetBinding(VT_EMPTY, DATAFORMAT_FGETDATA, prowset, pcolinfo, &binding, &cbAlloc, &dwCookie));

// Create an accessor HACCESSOR haccessor;

prowset->CreateAccessor(1, &binding, &haccessor, &bindstatus);

// Alloc memory for value void* pvData=malloc (cbAlloc);

// Get raw data from rowset prowset->GetData(hrow, haccessor, pvData);

```
// Ask format object to interpret data and return a variant
    VARIANT var;
    VariantInit(&var);
    DBSTATUS dbstatus;
    pdf->GetData(dwCookie, hrow, &var, &dbstatus,
        NULL);
// Display variant value as appropriate and continue pro-
cessing
```

DataFormats Collection Property

Typically, a control has a DataFormat property. Including a DataFormat property is beneficial for controls that are bound to a single field of data in a data 30 source. However, certain controls may have multiple bindings. For example, a data grid or table might have one binding per column and each column might have its own format object. The result of such a situation is that the DataFormat property may not be a top-level property on the control that the data consumer can use to access the format objects. Although the format objects remain available on the columns, it is a problem to set the format objects through the property browser. For this reason, a DataFormats collection is available as a property on any control that supports multiple data format objects.

The DataFormats collection is defined by the IStdDataFormatsDisp interface as stated below:

```
interface IStdDataFormatsDisp:IDataFormatsDisp
{
    [id(dispidFormatsCount), propget] HRESULT Count
        ([out, retval] long *pICount);
    [id(DISPID_NEWENUM), hidden] HRESUL
        T_NewEnum([out, retval] IUnknown
        **_ppNewEnum);
    [id(DISPID_VALUE)] HRESULT Item([in] VARIANT
        Index, [out, retval] DataFormat **ppFormat);
    [id(dispidFormatsAdd)] HRESULT Add([in] DataFormat
        *pFormat, [in, optional] VARIANT Index);
    [id(dispidFornatsRemove)] HRESULT Remove([in]
        VARIANT Index);
    [id(dispidFormatsClear)] HRESUL T Clear( );
}
```

For the DataFormats property in a property browser, for example, the property can be displayed as an ellipsis button that an end user can select to display a property page that contains a list of all format objects on the control. The end user is free to select the object or objects required to change and set properties as desired. For consistency, the format of a property page can be very similar in appearance to the property page already used for the single DataFormat property.

The DataFormats property can also be made available at runtime. The following example illustrates a pseudo-code example that can be used with respect to the DataFormats property. Note that this example iterates the collection and changes properties on each format object if its type is fmtBoolean.

```
    Dim FmtObj As StdDataFormat 'a standard format object
    Dim FmtCollection As StdDataFormats 'collection of
        format objects
    Datagrid1 is a datagrid on this form
    Set FmtCollection=Datagrid1.DataFormats 'get the col-
        lection
    'Iterate over the format objects
    For Each FmtObj in FmtCollection
    'If this is a boolean format, make sure it displays Yes/No.
    If FmtObj.Type=fmtBoolean Then
        FmtObj.True Value="Yes"
        FmtObj.False Value="No"
        FmtObj.NullValue=""
    End If
    Next
```

The following example illustrates another manner in which the DataFormats collection can be used by creating a new collection and some format objects, and then setting the DataFormats property on a control.

```
    Dim FmtObjAs StdDataFormat
    Dim FmtCollection As New StdDataFormats 'Allocate a
        new dataformats collection
    StdDataFormats. Clear 'make sure it starts out empty
    Create several new format objects and stuff them into the
        collection.
    Set FmtObj=New StdDataFormat
    FmtObj.Type=fmtCustom
    FmtObj.Format="$#, ##0.00"
    FmtCollection.Add FmtObj, "Amount"
    Set FmtObj=New StdDataFormat
    FmtObj.Type=fmtGeneral
    FmtCollection.Add FmtObj, "Name"
    'set the datagrid's collection property
    Set Datagrid1.DataFormats=FmtCollection
```

BINDING COLLECTION DATA REPEATER CONTROLS

Because data binding by way of the binding system 310 can be container independent, it can be useful to reuse or repeat certain of the binding system functionality in other contexts. For example, a data manipulation control that supports simple binding such as for a single row of data, can be repeatedly displayed on a display screen for each of multiple rows of data in a particular data store to support a multiple row user interface such as a data-bound listbox or for sub-forms of a master form. Thus, compound controls can be easily created by repeating basic controls from within a container or independent of a container.

To appreciate the process of repeating a control generally, it is useful to review an example of how data binding works for a single control and then expand the use of a single control to every row in the data store. First, presume that a compound control exists that contains a text box and a check box. A user can interact with the compound control by typing text into the text box and/or checking or un-checking the check box. The value of the text in the text box and the value of the check in the checkbox are exposed as properties of the objects. With data binding facilitated by the binding system 310, the fields from a data store can be associated with these properties because the compound control has chosen to re-expose these properties from the inner controls. The association facilitated by the previously disclosed binding collection technique, the compound control automatically reflects updated data values of the current row of date from the data store. The following pseudo-code example demonstrates the binding of two columns to the two properties:

```
    'Set up binding for the compound control
    Dim bc As New BindingCollection
    bc.Add Compound1, "Field1", "Text"
    bc.Add Compound1, "Field2", "Checked"
    Set bc. DataSource=DataSource1
```

The DataRepeater control takes the above disclosed binding concept one step further. Instead of facilitating data binding for a current row, the DataRepeater control facilitates data binding for multiple rows by repeating the compound control to form a list without having to modify the compound control. Note however, that there can be many more rows in a data store than are practical to display on a display screen. For this reason, one optimization can be to only perform data access and data binding operations for the rows that are visible at any given time. However, an alternative optimization can be realized by noting that if a compound control is created for every visible row, then the speed at which the entire display can be repaint may be slow. For this reason, only two instances of the compound controls area are necessary as disclosed below.

A first instance of the compound control is used to generate an off-screen rendering of what the control looks like given the data values for a particular row. The off-screen rendering is cached for every visible row. When it is time to paint a display screen with a given view of a control, the cached copy of the renderings of the rows are displayed on the display screen and the first instance of the control is never directly shown on the display screen. A second instance of the compound control is used to interact with the presently editable row. When the present row changes, for example in response to user input, the second instance of the compound control is moved to the current row to overlay the off-screen rendering. The control is also updated to contain relevant data for the row that is receiving focus. The result is that the user has the ability to conveniently edit every row, yet the screen updating process is very efficient because there is only one editable control on the screen at a time regardless of the number of visible rows.

The DataRepeater feature is not limited to use with compound controls however. The DataRepeater mechanism can also be applied to a singular control such as a text box. It is more interesting to discuss the compound case because users will typically define "bands" that repeat, and these "bands" will likely contain other controls.

Conclusion

The container independent data binding system of the present invention independently facilitates data binding by way of a binding system object on behalf of any data consumer that conforms to the necessary interfaces and protocols. The binding system facilitates data binding for visual and/or non-visual objects in addition to control data verification, binding collection, data conversion and formatting, and repeater control for any object that requires and requests access to these features rather than individually implementing these features without binding system support.

Although specific embodiments are disclosed herein, it is expected that persons skilled in the art can and will make, use, and/or sell alternative. container independent data binding systems that are within the scope of the following claims either literally or under the Doctrine of Equivalents.

What is claimed is:

1. A machine readable memory tangibly embodying instructions executable by a computer to perform a method for container independent data binding by way of a binding agent between a plurality of data consumers and a plurality of data sources, said method comprising:

implementing said binding agent as a container independent object separate from said plurality of data consumers and said plurality of data sources, wherein said binding agent is accessible to said plurality of data consumers and said plurality of data sources by way of a standard object interface and accompanying protocol such that each of said plurality of data consumers and each of said plurality of data sources can have direct access to their bound counterpart;

a first step of exposing said standard object interface for said binding agent so that said standard object interface is accessible to said plurality of data consumers and said plurality of data sources;

establishing a direct data binding association between at least one of said plurality of data consumers and at least one of said plurality of data sources by way of said binding agent upon request by said at least one data consumer, wherein said at least one data consumer has object characteristics selected from at least one group consisting of: a visual object, and a non-visual object; and supporting at least one optional data binding feature by way of said binding agent selected from at least one of a group consisting of: a data access interface arbitration mechanism, a binding collection method, a control data validation method, a data formatting method, and a data repeater control.

2. A method according to claim 1 wherein said step of implementing includes:

enforcing use of said standard object interface and said accompanying protocol between each of said plurality of data consumers and each of said plurality of data sources; and requiring that each of said plurality of data consumers that use said binding agent set a data source property.

3. A method according to claim 2 wherein said step of requiring includes:

first step of setting said data source property to identify one of said plurality of data sources to which a setting one of said plurality of data consumers is bound; and second step of setting a data member property to identify a sub-set of said data source to which said setting one of said plurality of data consumers is bound, in a manner that permits a plurality of said plurality of data consumers to bind to a common data member.

4. A method according to claim I wherein said step of exposing includes:

a second step of exposing a data source interface having at least one of a plurality of methods selected from a group consisting of: a first method to return a data access object for a data member, a second method to return a number of known data members within a data source, a third method to return a name of a known data member, a fourth method to add a listener to a notification list, and a fifth method to remove a listener from said notification list.

5. A method according to claim 4 wherein said step of exposing includes:

a third step of exposing a data source listener interface having at least one of a plurality of methods selected from a group consisting of: a first method to notify a listener of said data member availability, a second method to notify a listener of a new data member addition, and a third method to notify s aid listener of a data member removal.

6. A method according to claim 1 wherein said step of establishing includes:

communicating between a data access unaware data consumer and one of said plurality of data sources by way of said binding agent acting as a data access aware data consumer on behalf of said data access unaware data consumer;

second step of exposing data values of said data access unaware data consumer as properties on an object that is said data access unaware data consumer; and notifying interested ones of said plurality of data consumers of property modifications by said data access unaware data consumer.

7. A method according to claim 6 wherein said step of notifying includes:

first step of notifying said interested ones of said plurality of data consumers prior to said property modifications; and second step of notifying said interested ones of said plurality of data consumers after said property modifications.

8. A method according to claim 1 wherein said step of supporting said binding collection method includes:

adding multiple ones of said plurality of data consumers as objects to a data binding collection that are all bound to a common data source independent of any container requirement for any of said plurality of data consumers.

9. A method according to claim I wherein said step of supporting said data access interface arbitration mechanism includes:

initiating a query by any one of said plurality of data consumers as to which of at least one data access interface are available to access data from an identified one of said plurality of data sources;

selecting an acceptable one of said at least one data access interface through which data can be accessed from said identified one of said plurality of data sources in positive response to availability of said acceptable one of said at least one data access interface; and deferring data access interface selection and management to said binding agent in an absence of said acceptable one of said at least one data access interface.

10. A method according to claim 1 wherein said step of supporting said control data validation includes:

defining a validation causes criteria that identifies when said control data validation should occur for a container;

exposing a Boolean validation causes property to implement said validation causes criteria;

validating a control in response to an occurrence of one of said validation causes criteria; and aborting said step of validating said control in response to an objection by at least one of said plurality of data consumers.

11. A system according to claim 1 wherein said step of supporting said data formatting method includes:

converting data from an identified one of said plurality of data stores by way of said binding agent on request from one of said plurality of data consumers;

editing data from said identified one of said plurality of data stores by way of said binding agent on request from one of said plurality of data consumers; and reversing any data conversion and any data editing from said data that is written back to said identified one of said plurality of data stores.

12. A method according to claim 1 wherein said step of supporting said data repeater control includes:

generating a list-style data presentation for a visual object having exposed properties by way of said binding agent that repeats singular control operations across multiple rows of data from an identified one of said plurality of data stores to form compound controls.

13. A container independent data binding system having a binding agent between a plurality of data consumers and a plurality of data sources, said system comprising:

means for implementing said binding agent as a container independent object separate from said plurality of data consumers and said plurality of data sources wherein said means for implementing includes, means for configuring said binding agent for accessibility to said plurality of data consumers and said plurality of data sources by way of a standard object interface and accompanying protocol such that each of said plurality of data consumers and each of said plurality of data sources can have direct access to their bound counterparts;

first means for setting a data source property to identify one of said plurality of data sources to which a setting one of said plurality of data consumers is bound;

second means for setting a data member property to identify a subject of said data source to which said setting one of said plurality of data consumers is bound, in a manner that permits a plurality of said plurality of data consumers to bind to a common data member;

means for exposing said standard object interface for said binding agent so that said standard object interface is accessible to said plurality of data consumers and said plurality of data sources;

means for establishing a direct data binding association between at least one of said plurality of data consumers and at least one of said plurality of data sources by way of said binding agent upon request by said at least one data consumer, wherein said at least one data consumer has object characteristics selected from at least one of a group consisting of: a visual object, and a non-visual object; and means for supporting at least one optional data binding feature by way of said binding agent selected from at least one of a group consisting of: a data access interface arbitration mechanism, a binding collection method, a control data validation method, a data formatting method, and a data repeater control.

14. A system according to claim 13 wherein said first means for exposing includes:

a second means for exposing a data source interface having at least one of a plurality of methods selected from a group consisting of: a first method to return a data access object for a data member, a second method to return a number of known data members within a data source, a third method to return a name of a known data member, a fourth method to add a listener to a notification list, and a fifth method to remove a listener from said notification list.

15. A system according to claim 14 wherein said first means for exposing includes:

a third means for exposing a data source listener interface having at least one of a plurality of methods selected from a group consisting of: a first method to notify a listener of said data member availability, a second method to notify a listener of a new data member addition, and a third method to notify said listener of a data member removal.

16. A system according to claim 13 wherein said means for establishing includes:

means for communicating between a data access unaware data consumer and one of said plurality of data sources by way of said binding agent acting as a data access aware data consumer on behalf of said data access unaware data consumer;

second means for exposing data values of said data access unaware data consumer as properties on an object that is said data access unaware data consumer; and means for notifying interested ones of said plurality of data consumers of property modifications by said data access unaware data consumer.

* * * * *

UNITED STATES PATENT AND TRADEMARK OFFICE
CERTIFICATE OF CORRECTION

PATENT NO. : 6,463,442 B1
DATED : October 8, 2002
INVENTOR(S) : Bent et al.

It is certified that error appears in the above-identified patent and that said Letters Patent is hereby corrected as shown below:

Title page,
Item [56], References Cited, U.S. PATENT DOCUMENTS, the following should be listed:

| | | |
|---|---|---|
| -- 5,255,356 | 10/1993 | Michelman et al. |
| 5,388,196 | 02/1995 | Pajak et al. |
| 5,396,587 | 03/1995 | Reed et al. |
| 5,452,459 | 09/1995 | Drury et al. |
| 5,485,617 | 01/1996 | Stutz et al. |
| 5,706,505 | 01/1998 | Fraley et al. |
| 5,835,904 | 11/1998 | Vicik et al. -- |

Column 9,
Line 9, "If the...." should begin a new paragraph.

Column 13,
Line 53, "IOIObject::GetClientSite" should read -- IOIeObject::GetClientSite --.

Column 15,
Line 59, "bidirectional" should read -- bi-directional --.

Column 16,
Line 57, "pdwcookie);" should read -- pdwCookie); --.
Line 60, "pdispobject);" should read -- pdispObject); --.
Line 62, "pvto);" should read -- pvTo); --.
Line 63, "ReleaseData(f[in]" should read -- ReleaseData([in] --.
Line 65, "D WORD" should read -- DWORD --.

Column 19,
Line 38, "[id(dispidFornatsRemove)]" should read -- [id(dispidFormatsRemove)] --.

UNITED STATES PATENT AND TRADEMARK OFFICE
CERTIFICATE OF CORRECTION

PATENT NO. : 6,463,442 B1
DATED : October 8, 2002
INVENTOR(S) : Bent et al.

It is certified that error appears in the above-identified patent and that said Letters Patent is hereby corrected as shown below:

<u>Column 22,</u>
Line 62, "s aid" should read -- said --.

<u>Column 24,</u>
Line 29, "subject" should read -- sub-set --.

Signed and Sealed this

First Day of June, 2004

JON W. DUDAS
*Acting Director of the United States Patent and Trademark Office*